United States Patent [19]

Parkes et al.

[11] Patent Number: 4,564,795
[45] Date of Patent: Jan. 14, 1986

[54] MOTOR SPEED CONTROL SYSTEM

[75] Inventors: Christopher W. Parkes, San Francisco; Robert C. Franklin, Los Gatos, both of Calif.

[73] Assignee: Beckman Instruments, Inc., Fullerton, Calif.

[21] Appl. No.: 572,134

[22] Filed: Jan. 20, 1984

Related U.S. Application Data

[63] Continuation of Ser. No. 332,578, Dec. 21, 1981.

[51] Int. Cl.[4] .......................... H12P 5/16; H02P 5/36
[52] U.S. Cl. .................... 318/314; 318/318; 318/490; 318/800; 318/801; 318/802
[58] Field of Search ............... 318/314, 490, 318, 800, 318/801, 802, 803; 324/163; 242/186

[56] References Cited

U.S. PATENT DOCUMENTS

| 3,368,133 | 2/1968 | Zenner | 318/801 |
| 3,858,100 | 2/1974 | Bussi et al. | 318/314 |
| 3,883,785 | 5/1975 | Fulcher et al. | 318/314 |
| 3,887,853 | 6/1975 | Klein et al. | 318/801 |
| 3,919,634 | 11/1975 | Appel et al. | 324/163 |
| 4,024,445 | 5/1977 | Tokuda et al. | 318/318 |
| 4,174,079 | 11/1979 | Hoyashi | 242/186 |
| 4,193,020 | 3/1980 | Song | 318/314 |
| 4,211,967 | 4/1980 | Akiyama et al. | 318/490 |
| 4,224,558 | 9/1980 | Hays | 318/314 |
| 4,286,203 | 8/1981 | Ehret | 318/801 |
| 4,380,723 | 4/1983 | Leis | 318/314 |

FOREIGN PATENT DOCUMENTS

| 155589 | 12/1980 | Japan | 318/314 |
| 608666 | 1/1979 | Switzerland | 318/314 |

OTHER PUBLICATIONS

Title: A Phase-Locked Loop Motor Control System, Author: D. H. Smithgall, Date: Nov. 1975, Publisher: IEEE.

Primary Examiner—William M. Shoop, Jr.
Assistant Examiner—Paul Shik Luen Ip
Attorney, Agent, or Firm—W. H . May; P. R. Harder; S. R. Markl

[57] ABSTRACT

An improved motor speed control system for high speed, high resolution motor control applications such as centrifuges is presented. A proportional, or proportional and integral motor control system is provided with improved circuitry which uses digital phase lock techniques to generate a speed difference signal that accurately reflects the difference between the actual and desired speed of the motor. This speed difference signal is used to adjust the speed of the motor until the actual and desired speeds become approximately equal to one another. An error integrating network may then be enabled to eliminate any remaining difference between actual and desired speed, thereby assuring a negligible speed error.

18 Claims, 1 Drawing Figure

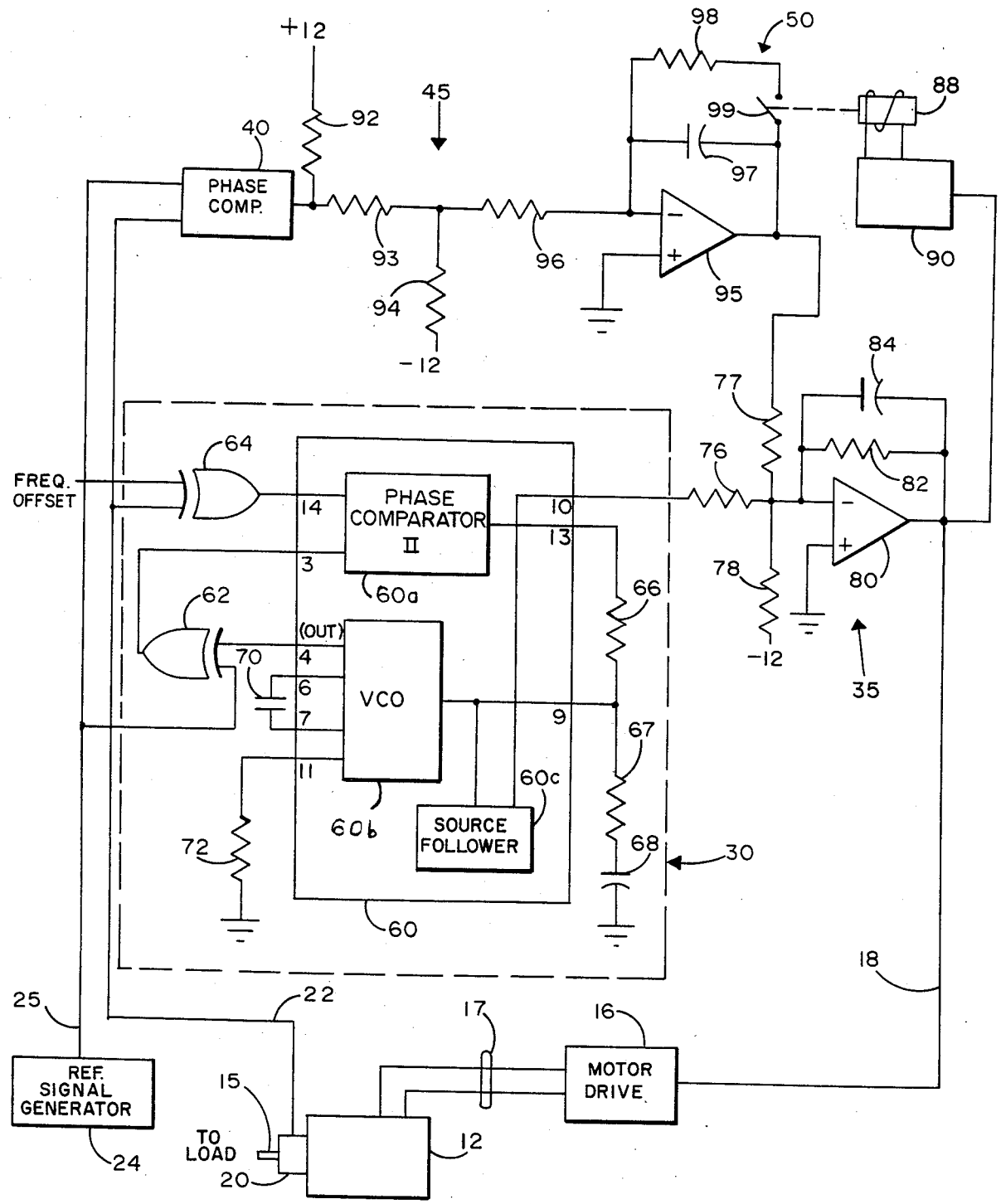

MOTOR SPEED CONTROL SYSTEM

This is a continuation of application Ser. No. 332,578, filed Dec. 21, 1981.

BACKGROUND OF THE INVENTION

In precision speed control systems, such as those used in centrifuges, both a wide range of speed control and high accuracy in speed control resolution are desirable. A centrifuge may, for example, have to operate through a speed range of many thousands of rpm and to yet be able to attain and remain controlled at a speed within of only a few rpm of the desired value. One approach to meeting these control requirements has involved the use of phase-locked control loop type electronic systems. In such systems a digital reference signal that is indicative of the desired speed is compared in phase with a digital tachometer signal produced by increasing the motor speed; to generate a phase difference signal. The latter signal is then used to change the motor speed as necessary to drive the tachometer signal into frequency and phase match with the reference signal.

While phase-locked control loop type systems are adequate for many applications, they suffer from two serious problems. The first problem is the actual and desired speed signals must have individual frequencies which are quite close to one another before the phase-locked loop circuit can achieve a stable locked condition. This is the result of deficiencies in the phase comparators used in phase locked loop electronic control systems, coupled with the time lag phenomenon in speed control associated with the inertia of the motor, which give rise to instability when the motor attempts to attain the desired speed from too far away. Accordingly, speed control systems that utilize control loop techniques require electronic circuit design which is able to first bring motor speed within a capture range of the phase-locked control loop and then surrender control thereto. This greatly complicates the electronic circuitry and the cost of its design and manufacture.

A second problem is the existence of a common mode component in the signal produced by the phase comparator used in a phase-locked control loop system, a common mode component. The results is, the output signal of the phase comparator will vary in relationship to a percentage difference, rather than the absolute difference between its input signal frequencies. This relationship causes the stability and resolution of the speed control system to change with the frequency of the reference signal.

While it is possible in principle to design analog electronic control circuits which are less subject to the described problems, of digital phase-locked control loop circuits, such analog circuits create other characteristic problems. Analog circuits are, for example, subject to thermal instability as the result of changes in the ambient temperature and are strongly affected by tolerances of their comprising electronic components. As a result, analog speed control systems often require the use of precision electronic components costing significantly more, costly thermal compensation systems and elaborate calibration procedures. These reaons may make precision analog speed control systems prohibitively expensive.

SUMMARY OF THE INVENTION

In accordance with the present invention, an improved speed control system is taught which can provide a wide range of speeds, which accurately attains and maintains a desired speed and which is not subject to calibration or compensation dependencies.

The present invention is a speed control system that includes an improved speed difference detector which uses digital phase-locked control loop techniques to generate a speed diference signal that is accurately proportional to the frequency difference between a digital reference signal indicative of the desired motor speed and a digital tachometer signal or other feedback signal indicative of the actual motor speed. The speed difference signal is an analog signal and is applied to a summing amplifier which in turn provides a speed control signal to the motor drive circuitry.

When the difference between the actual speed and desired speed of the motor is large, the summing amplifier operates in a limited output voltage (saturated) mode to provide a speed control signal to the motor drive circuitry that rapidly accelerates (or decelerates) the motor. As the difference between the actual speed and desired speed of the motor becomes smaller, the summing amplifier begins to operate within its linear design range controlling motor acceleration more slowly towards the desired final value. Finally, as the difference between the actual speed and desired speed of the motor becomes very small, the output of the summing amplifier approaches a constant value indicative of the desired motor speed.

In applications that require a precisely defined final speed, an additional input signal produced by an integrating circuit which integrates the phase and frequency difference between the actual speed and desired speed signals may be applied to the summing amplifier. The integrating circuit accumulates even small differences between the actual speed and desired speed signals to produce a speed control signal that is devoid of any residual, and steady state errors. In this manner, the speed of the motor is forced to a precise value corresponding to the speed called for by the reference signal.

The improved speed control system of the present invention comprises a subsystem that includes a digital phase comparator, a voltage controlled oscillator (VCO) and a low pass filter circuit, each of which is of the type frequently used in phase locked loop circuits. In this subsystem an input of the phase comparator is a signal produced by combining the output signal of the VCO and the reference signal. The other phase comparator input is a tachometer signal which indicates the actual speed of the motor. One beneficial effect of this system is that the subsystem produces a signal that is related to the frequency difference between the signals applied thereto rather than a signal that is related to the phase difference between those signals. This obviates the capture and stability problems that result from conventional use of a phase comparator in a phase-locked control loop type motor control system. (A similar result will occur if the connections of the reference and tachometer signals are interchanged.) As a result, the control system operates as an accurate proportional feedback system.

Preferably, the speed difference signal displays an analog voltage that is derived from the analog input voltage of the VCO. This allows the speed difference detector to interface directly with the summing amplifier which may add a correction signal to the speed difference signal such as, for example, a signal produced by an error integrating network responsive to the phase and frequency difference between the desired and actual speed signals. Such a correction signal may be desirable to eliminate the steady state error that is inherent in all proportional-type feedback control systems. Thus, a motor control system utilizing the present invention has the advantages of digital circuitry, such as freedom from instability and critical component tolerances, and the advantages of analog circuitry, such as easily combinable signals.

These and other features of the present invention will be distinctly described in connection with the accompanying drawing.

DESCRIPTION OF THE DRAWINGS

The single drawing is a combined block-schematic diagram of the preferred embodiment of the present invention.

DESCRIPTION OF THE PREFERRED EMBODIMENT

Referring to the drawing, there is shown an a-c motor 12 having an output shaft 15 for driving a load (not shown) such as a centrifuge or other rotating machine. Operating power is supplied to motor 12 through power leads 17 which connect motor 12 to the output of a variable speed a-c motor drive unit 16. The speed at which drive unit 16 drives motor 12 is dependent upon the magnitude of an analog speed control signal which is applied to drive 16 through an input line 18. As will be explained more fully presently, drive 16 is conventional and need not be of a highly linear or drift-free type. This is because the feedback provided by the control system of the invention will automatically compensate for any drift or nonlinearity in drive 16. Accordingly, the internal structure of drive unit 16 will not be described herein.

Associated with motor 12 is a feedback signal generating circuit, here shown as a tachometer 20, which may be mounted on the housing of motor 12, as shown, or in any other suitable manner, and which provides on an output lead 22 a feedback or actual speed signal that is indicative of the rotational speed of shaft 15. Tachometer 20 is preferably of the type which provides a digital or two-state output signal the frequency (more precisely the repetition rate) of which is directly proportional to motor speed. The duty cycle of this signal is unimportant since the digital portion of the circuitry of the invention is responsive only to the positive-going edges of the digital signals applied thereto.

Also associated with motor 12 is a reference signal generating circuit 24. The latter circuit, which may be of any of a number of well known types, serves to generate on conductor 25 a digital signal the frequency of which is related to the desired speed of motor 12. Circuit 24 may, for example, comprise an oscillator the frequency of which may be controlled by a manually adjustable potentiometer, thumbwheel switches or an output port of a suitable mini or microcomputer. Because the manner in which the reference signal is generated is conventional and forms no part of the present invention, the internal structure thereof will not be described herein.

To the end that the actual speed signal from tachometer 20 may be combined with the reference signal from generating circuit 24 to generate a speed difference signal suitable for use in controlling motor 12, there is provided the electronic speed control circuitry shown in the remainder of the drawing. Broadly speaking, the latter circuitry comprises a main speed control loop including a speed difference detector network 30 and a summing amplifier 35. Also included in the speed control circuitry, although its presence is not essential to the present invention, is a secondary control loop that includes a digital phase comparator 40, a level shifting network 45, and an integrating network 50. As will be explained in detail later, the main speed control loop allows the speed of motor 12 to be adjusted over a wide range of speeds, without regard to the magnitude of the difference between the initial and desired final speeds. The secondary speed control loop may be (and in the preferred embodiment is) provided to reduce or eliminate any steady state speed error in the main speed control loop, thereby assuring that the system provides a precisely specified speed.

In the illustrated embodiment summing amplifier 35 includes an operational amplifier 80 which operates from ±12 volt power supplies (not shown) and which has a non-inverting (+) input that is connected to the mid-point of those power supplies, a point which also serves as the system ground. These connections allow amplifier 80 to provide output voltages which can vary symmetrically with respect to the system ground. Summing amplifier 35 also includes input resistors 76, 77 and 78, through which respective input signals may be applied for summation by amplifier 80, a feedback resistor 82, and a feedback capacitor 84. The latter are preferably chosen to have values such that amplifier 35 has a low pass filtering characteristic. Because the operation of summing amplifiers is well known, summing amplifier 35 will not be described in detail herein.

In the present embodiment, speed difference detector 30 includes a phase locked loop integrated circuit or chip 60 which may be of the type manufactured under the designation CD4046 by R.C.A. and under similar designations by a number of other manufacturers, a digital feedback network here shown as an exclusive-OR gate 62, a low pass filter network made up of a resistor 66, a resistor 67 and a capacitor 68, a capacitor 70 and a resistor 72, all of which will be described presently. For the sake of easy cross reference, the leads of chip 60 are labeled with numbers which are the same as the pin numbers used by the manufacturer thereof. Speed difference detector circuit 30 also includes an additional exclusive-OR gate 64, which is associated with a biasing feature which will be described later. The power leads of chip 60 (not shown) are connected between ground and the +12 volt power supply.

Speed difference detector circuit 30 is most easily understood as a closed-loop subsystem that utilizes phase-locked loop circuitry the characteristics of which have been modified by the addition of a digital signal combining element (such as 62) so that it provides frequency rather than phase difference information to the overall system of which it is a part. This frequency or, equivalently, speed difference information is then used in the main speed control loop of an overal speed control system of the proportional type to control the speed of motor 12. One important advantage of this arrangement is that the overall speed control system is not subject to the previously described problems with phase-locked loop type control systems. Another important advantage of this arrangement is that, unlike previously known proportional type speed control systems, the desired speed difference signal is generated using digital techniques which eliminate problems such as thermal drift and the use of precision components and elaborate calibration procedures. Thus, the motor control system of the invention has both the flexibility of proportional type speed control systems and the advantages of phase-locked loop type speed control systems.

Shown within the outline of integrated circuit 60 is a block diagram of those of the circuit networks included therein that are used in practicing the present invention. These networks include a phase comparator or detector 60a, a voltage controlled oscillator (VCO) 60b, and a source follower network 60c. Phase comparator 60a serves to receive the digital signals on input pins 3 and 14 and to generate on output pin 13 a tri-state digital signal dependent upon the phase angle between the signals on pins 3 and 14. These three states include a zero volt state, a +12 volt state and an open circuit state. Phase comparator 60a has associated therewith the Roman numeral II, the latter being a type number used by the manufacturer to distinguish phase comparator 60a from another selectable phase comparator (identified by the Roman numeral I) which is present on the same chip. The type I phase comparator is not used in practicing the present invention because of its tendency to lock onto harmonics of the VCO frequency. Detailed information concerning the internal structure and operation of phase comparator 60a is hereby expressly incorporated herein by reference from pages 488–492 of an R.C.A. publication entitled "RCA COS/MOS Integrated Circuits", published in 1978.

VCO 60b serves to receive (at pin 9) the output voltage of phase comparator 60a, after the latter has been filtered by low pass filter 66–68, and to generate (at pin 4) a digital signal the frequency of which is proportional to the voltage at pin 9. To this end, resistors 66 and 67 and capacitor 68 of the low pass filter network are connected between pins 9 and 13 and the circuit ground in the manner suggested by the manufacturer, resistor 67 serving to introduce a phase lead into the internal feedback path within network 30. The rate at which the VCO output frequency changes with changes in its input voltage is fixed by capacitor 70 and resistor 72, which are connected to pins 6, 7 and 11 in the manner suggested by the manufacturer. It will be understood that resistor 72 and capacitor 70 should provide a rate of change of frequency with voltage that is reasonable in view of the range of speeds over which motor 12 is to operate.

Source follower network 60c receives the filtered d-c voltage which low pass filter 66–68 applies to input pin 9 and applies to output pin 10 a voltage that is equal thereto. The advantage of using source follower 60c is that it allows pin 10 to supply an output current of a usable magnitude without loading and therefore affecting the operation of low pass filter 66–68. Because both the frequency of the digital signal on output pin 4 and the magnitude of the analog d-c voltage at output pin 10 are fixed by the output voltage of low pass filter 66–68, it will be seen that the signal at output pin 10 of chip 60 conveys the same information as the digital signal on output pin 4 thereof.

In the illustrated embodiment speed difference detector 30 uses the above-described phase locked loop circuitry to generate frequency rather than phase difference information about the desired and actual speed signals. This occurs because a digital signal combining element, here shown as an exclusive-OR gate 62, is connected between output pin 4 (the output of VCO 60b) and input pin 3 (one input of phase comparator 60a). As a result of this connection, pin 3 of chip 60 is connected to receive a signal produced by digitally combining or adding the reference signal and the output signal of VCO 60b, while the actual speed signal from tachometer 20 is applied to pin 14. Since the phase locked loop circuitry will change its VCO output frequency as necessary to make the frequency of the signals at the two inputs of its phase detector equal to one another, i.e., to make $F_{VCO}+F_{REF}=F_{TACH}$, the frequency of the VCO output signal will equal $F_{TACH}-F_{REF}$, the desired frequency difference signal. Since, as previously explained, the same frequency difference information is available in analog form at outpin pin 10, it will be seen that circuit 30 provides frequency difference information having a digital underpinning.

The significance of the above frequency difference information is that, since the frequencies of the reference and actual speed signals bear a one to one relationship to desired and actual motor speeds, the frequency difference therebetween is a direct indication of the difference between the actual and desired speed of the motor, i.e., the speed error of the system. As a result, speed difference detector 30 is usable as a part of the overall proportional type speed control system shown in the drawing. Assume, for example, that motor 12 is operating under steady state conditions. Under these conditions, the frequency of the actual speed signal will be approximately equal to the frequency of the reference signal, causing the speed difference signal on pin 10 of circuit 60 to have a relatively small value. This speed difference signal is supplied to motor drive 16 through input resistor 76 of summing amplifier 35. Leaving aside, for present purposes, the effect of the other signals which are applied to summing amplifier 35 through input resistors 77 and 78, amplifier 35 serves as an inverting amplifier which provides to motor drive 16 an analog speed control signal that is proportional to the speed difference signal received at pin 10.

As is the case with all proportional type speed control systems, the above speed control signal deviates from its ideal, zero value by the amount necessary to supply the required load power and compensate for system losses such as friction. Since the non-zero speed control signal from summing amplifier 35 requires a non-zero speed difference signal at pin 10, the actual speed signal will not have exactly the same frequency as the reference signal. The amount by which the speed difference signal on pin 10 differs from its ideal zero value is known as the steady state error of the system. Naturally, the higher the gain of speed difference detector 30 and/or summing amplifier 35, the smaller this steady state error will be. The manner in which this steady state error may be substantially eliminated will be described later in connection with the secondary speed control loop including networks 40, 45 and 50.

If the above-described conditions are changed by, for example, doubling the frequency of the reference signal, the speed difference signal at pin 10 will increase substantially. For such relatively large changes in the speed difference signal, the output voltage of summing amplifier 35 will be quickly driven to a limiting (saturation) value corresponding to one of the power supply voltages, in this case +12 volts. In this saturated condition, motor drive 16 will be provided with a high, substantially constant d-c signal which will cause it ot accelerate motor 12 toward its new final value. This acceleration will persist until the frequency of the actual speed signal on conductor 22 approaches sufficiently close to that of the reference signal on conductor 25 that the speed difference signal becomes small enough to allow amplifier 80 to come out of saturation. The latter condition is accompanied by a slowing of the acceleration of motor 12, which slowing continues as the frequency of the actual speed signal approaches closer and closer to the frequency of the reference signal. Finally, as the frequency of the actual speed signal becomes approximately equal to that of the reference signal, a new steady state condition is attained at a new value of steady state speed error. As will be explained later in connection with the frequency offset signal, a similar sequence of events (except for a sign reversal), will be understood to occur when a change in the reference signal requires a deceleration of motor 12. Thus, it will be seen that all changes in the speed of motor 10 occur in orderly manner, without the capture and locking problems which are known to be associated with phase locked loop type speed control systems.

While the foregoing description involves the application of the actual speed signal to pin 14 of circuit 60 (through an exclusive-OR gate 64 which will be discussed later), and the application of the reference signal to exclusive-OR gate 62, a similar signal will appear at pin 10 if the connections of these signals are interchanged. More particularly, the just mentioned interchange of connections will produce a speed difference signal that has the same magnitude as that described above, but with a reversed polarity. Accordingly, interchanging the connections of the reference and actual speed signals may require that the speed difference signal be applied to the non-inverting rather than the inverting input of operational amplifier 80, or that an additional, inverting operational amplifier be connected between pin 10 and amplifier 80. Thus, it is important only that one input of phase comparator 60a is supplied with one of the reference and actual speed signals, while the remaining input of phase comparator 60a is supplied with a signal produced by combining the output signal of VCO 60b with the other of those signals.

In the event that it is desirable to reduce or eliminate the above-described steady state speed error, this may be accomplished by using the illustrated secondary speed control loop including phase comparator 40, level shifting network 45, and integrating network 50. Also associated with the secondary speed control loop is a relay 88 and a relay control circuit 90 which together serve to enable integrating network 50 only when the speed of motor 12 is close to its steady state value. Generally speaking, the secondary speed control loop utilizes the phase and frequency difference between the reference and actual speed signals to generate a correction signal which, when added to the speed difference signal from detector network 30, results in a signal which allows the speed error of the system to be driven even closer to its ideal, zero value. Stated differently, the use of the secondary speed control loop with an integrating network effectively converts the illustrated control system to a proportional-plus-integral type control system, and thereby eliminates steady state errors.

The operation of the secondary speed control loop will now be described. Phase comparator 40 is preferably of the same type as phase comparator 60a of speed difference detector 30. Phase comparator 40 may, for example, be a part of a second phase locked loop integrated circuit of the type described above in which only the phase comparator portion thereof is used. Because the inputs of phase comparator 40 ar connected to receive the reference and actual speed signals, the voltage at the output thereof will be dependent upon the phase and frequency difference between those signals.

In order that the tri-state (zero volt, +12 volt, open circuit) digital signal produced by phase comparator 40 may be converted to a tri-state (−6 volt, +6 volt, zero volt) signal suitable for application to integrating network 50, there is provided a level shifter network 45 which includes resistors 92, 93 and 94. There resistors are connected in the illustrated manner between the previously mentioned +12 and −12 volt power supplies. Phase comparator 40 cooperates with level shifting network 45 to supply integrating network 50 with a digital signal that includes a succession of +6 and −6 volt pulses, separated by zero volt intervals. When the reference frequency is greater than the tachometer frequency, the average value of this digital signal has a first polarity and a magnitude that is dependent upon the magnitude of the difference between those frequencies. When the reference frequency is less than the tachometer frequency, the average value of this digital signal has the opposite polarity and a magnitude that is again dependent upon the magnitude of the difference between those frequencies. As a result, it will be seen that integrating network 50 is provided with a digital correction signal having a magnitude and sign that is dependent upon the magnitude and sign of the speed error of the system. This, in turn, allows integrating network 50 to accumulate the effect of the steady state speed error of the main control loop and to use the same to provide an analog correction signal which, when added to the output of the main speed control loop in summing amplifier 35, forces the actual speed of motor 12 to become substantially equal to that called for by the reference signal. In view of their just-described function, it will be apparent that phase comparator 40 and level shifting network 45 may be replaced by an additional speed difference detector of the type described in connection with network 30 above. If the latter replacement is made, it may also be necessary to use biasing circuitry of the type which will be described later in connection with gate 64 and resistor 78.

In the illustrated embodiment integrating network 50 includes an operational amplifier 95, having an input resistor 96, a feedback capacitor 97, and a resistor 98 through which capacitor 97 may be discharged when a contact 99 of relay 88 is closed by relay control network 90. Except for resistor 98 and contact 99, integrating network 50 is of a conventional design and serves to produce an output voltage that is proportional to the integral of its input voltage. As a result, integrating network 50 converts the above-described digital correction signal into an analog correction signal which is suitable for application to summing amplifier 35. In view of its conventional design (except as noted), integrating network 50 will not be described in detail herein.

While integrating network 50 is beneficial in eliminating the small steady state error of the main speed control loop, it can lengthen the time required for the motor speed to reach a new steady state value after a large change in desired speed. This is because the large phase and frequency differences that are associated with large changes in desired speed will quickly cause the output voltage of amplifier 95 to be driven to its limiting value. Since this output voltage can only be driven from its limiting value by integrating a digital correction signal of the opposite polarity, the integrating network causes the circuit to overshoot, undershoot and generally exhibit undesirable dynamic response characteristics.

In order to eliminate these undesirable tendencies, integrating network 50 is provided with switch contact 99 which, with resistor 98, serves to maintain integrating capacitor 97 in a discharged condition until the actual motor speed is relatively closed to the desired motor speed. Once the latter condition exists, integrating network 50 is effectively enabled by relay control network 90 which opens short circuiting contact 99 and thereby allows capacitor 97 to begin charging. Integrating network 50 then operates in the previously described conventional manner to eliminate the steady state speed error of the main speed control loop.

To the end that the state of contact 99 may be controlled so as to automatically accomplish the above-described result, contact 99 may be the normally open contact of a relay 88 which is in turn controlled by relay control network 90. The latter network is preferably arranged so that relay 88 closes switch contact 99 whenever the output voltage ot summing amplfier 35 is more than a predetermined number of volts positive or negative from zero. In this manner, when the output voltage of amplifier 35 is sufficiently close to its final value to indicate that the motor is operating at approximately the desired speed, network 90 deenergizes relay 88. This, in turn, opens contact 99 and enables the previously described integrating action. Since relay control network 90 may comprise a window comparator circuit of a type that is well known to those skilled in the art, the internal structure thereof will not be described in detail herein.

Because the zero to +12 volt power supply connections of phase locked loop circuit 60 prevent the output voltage thereof from assuming negative values, circuit 60 cannot deal effectively with negative speed difference values. In order to eliminate this problem, it is desirable to in effect bias phase locked loop circuit 60 so that it has a positive non-zero output voltage when the actual and desired motor speeds are equal to one another. Through the use of this bias, phase locked loop circuit 60 may be made to respond symmetrically to both positive and negative speed errors.

To the end that the above-mentioned biasing may be accomplished, a digital frequency offset signal produced by a suitable oscillator (not shown) may be combined with the actual speed signal on conductor 22, in an exclusive-OR gate 64, before being applied to input pin 14 of phase locked loop circuit 60. This causes pin 14 of circuit 60 to be supplied with a digital signal having a frequency equal to the sum of the actual speed signal and the frequency offset signal. This, in turn, forces circuit 60 to match the reference signal frequency with the last mentoned summation signal rather than with the actual speed signal. As a result, the speed difference signal on pin 10 will have a non-zero value when the actual and desired speeds are equal to one another. Stated differently, the speed difference signal on pin 10 will be approximately equal to zero only when a predetermined frequency difference exists between the reference and actual speed signals. For general purpose applications a frequency offset signal having a frequency corresponding roughly to the mid point of the VCO frequency range will be suitable.

While the above-described biasing improves the performance of phase locked loop circuit 60, it will introduce a sizable error in the speed control signal unless it is compensated for. One manner in which this compensation may be accomplished is the application of an analog bias cancelling signal to a further input of summing amplifier 35, through resistor 78. The effect of this cancelling signal is to subtract off, in summing amplifier 35, the component of its total input current that is attributable to the above-mentioned frequency offset signal. In this manner, the effect of the frequency offset signal is confined to detector 30, where its effects are beneficial, and is prevented from reaching motor drive 16 where its effects could be detrimental. It will be understood that the introduction of the frequency offset signal at exclusive-OR gate 64 has no effect on the previously mentioned interchangeability of the connections of the reference and actual speed signals.

In view of the foregoing, it will be seen that the speed control system contemplated by the present invention includes at least a main speed control loop having an improved speed difference detector network. This speed difference detector comprises a phase locked loop circuit. As a result, there is imparted to the main speed control loop the accuracy and self-adjusting properties of digital phase locked loop circuitry without also imparting thereto the capture and locking problems that are associated with phase locked loop type control systems. The speed control system of the invention preferably also includes a secondary speed control loop which is capable of eliminating any steady state errors in the main speed control loop. As a result, the speed control system of the invention cannot only be adjusted over a wide range of speeds, but can also settle, within great precision, to the desired value in that range.

What is claimed is:

1. In a motor speed control system having a first signal generating device for producing a digital feedback signal having a frequency indicative of the actual speed of the motor, and a second signal generating device for producing a digital reference signal having a frequency indicative of the desired speed of the motor, the improvement comprising:

(a) a phase comparator having first and second inputs and an output, one of said first or second inputs receiving one of said feedback signal or said reference signal and the other of said inputs receiving the other of said signals, (b) a voltage controlled oscillator having an input and an output, (c) means including low pass filter for connecting the output of the phase comparator to the input of the voltage controlled oscillator, (d) means for connecting the first input of the phase comparator to receive said one of the feedback and reference signals, (e) first digital signal combining means for combining the signal at the output of the voltage controlled oscillator with said other of the feedback and reference signals, said signal combining means having an output connected to the second input of the phase comparator, (f) summing amplifier means having an input and an output, said input receiving an output signal from said low pass filter, (g) whereby the signal at the output of the low pass filter comprises a speed difference signal that varies in accordance with the difference between the actual and desired speed of the motor and is substantially independent of the phase angle between the feedback and reference signals and said speed difference signal is linearly proportioned by said summing amplifier means to provide a speed control signal.

2. A motor speed control system as set forth in claim 1 in which the first signal combining means comprises an exclusive-OR gate.

3. A motor speed control system as set forth in claim 1 or 2 further including circuitry for generating a digital frequency offset signal, second signal combining means for combining the digital frequency offset signal with said one of the feedback and reference signals, said second signal combining means serving as the connecting means for the first input of the phase comparator and introducing a d-c bias into the speed difference signal.

4. A motor speed control system as set forth in claim 3 further including a summing amplifier having a first input connected to receive the speed difference signal and a second input connected to receive a d-c signal substantially equal to said d-c bias.

5. A motor speed control system as set forth in claim 1 or 2 further including means for generating an analog correction signal the magnitude and sign of which varies in accordance with the integral of the phase and frequency difference between the feedback and reference signals, and a summing amplifier for algebraically combining the speed difference and correction signals.

6. A motor speed control system as set forth in claim 5 further including switching means for disabling the correction signal generating means when the magnitude of the speed difference signal exceeds a predetermined value.

7. In a motor speed control system having a first signal generating device for providing a feedback signal having a frequency indicative of the actual speed of the motor, and a second signal generating device for providing a reference signal having a frequency indicative of the desired speed of the motor, the improvement comprising:
(a) a phase locked loop circuit having first and second phase comparator inputs, a phase comparator output, a voltage controlled oscillator input and a voltage controlled oscillator output, one of said first or second phase comparator inputs receiving one of said feedback signal or said reference signal and the other of said phase comparator signals receiving the other of said signals,
(b) a low pass filter connected between the phase comparator output and the voltage controlled oscillator input,
(c) first connecting means for connecting one of the feedback and reference signals to the first phase comparator input,
(d) combining means for digitally combining the signal at the voltage controlled oscillator output and the other of the feedback and reference signals,
(e) second connecting means for connecting the combining means to the second phase comparator input,
(f) summing amplifier means having an input and an output, said input receiving an output signal from said low pass filter,
(g) whereby the signal at the output of the low pass filter varies in accordance with the frequency difference between the feedback and reference signals and is substantially independent of the phase angle between the feedback and reference signals.

8. A motor speed control system as set forth in claim 7 in which the combining means comprises an exclusive-OR gate.

9. A motor speed control system as set forth in claim 7 further including circuitry for generating a digital offset signal and means for combining the digital offset signal with said one of the feedback and reference signals before application to the first phase comparator input, whereby a d-c bias is introduced into the speed difference signal.

10. A motor speed control system as set forth in claim 9 further including a summing amplifier having a first input connected to receive the speed difference signal and a second input connected to receive a signal for cancelling the effect of said d-c bias.

11. A motor speed control system as set forth in claim 7 or 8 further including means for generating an analog correction signal the magnitude and sign of which varies in accordance with the integral of the phase and frequency difference between the feedback and reference signals, and a summing amplifier for algebraically combining the speed difference and correction signals.

12. A motor speed control system as set forth in claim 11 further including switching means for disabling the correction signal generating means when the magnitude of the speed difference signal exceeds a predetermined value.

13. A speed difference detector network for generating a speed control signal that varies in accordance with the frequency difference between a digital feedback signal having a frequency indicative of the actual speed of a motor and a digital reference signal having a frequency indicative of the desired speed of that motor, characterized by:
(a) a digital phase comparator having first and second inputs and an output, one of said first or second inputs receiving one of said feedback or said reference signals and the other of said inputs receiving the other of said signals,
(b) a voltage controlled oscillator having an input for receiving an analog input voltage and an output for supplying a digital output voltage,
(c) a low pass filter connected between the output of the phase comparator and the input of the voltage controlled oscillator,
(d) means for applying one of the feedback and reference signals to one input of the phase comparator,
(e) combining means for digitally combining the digital output voltage of the voltage controlled oscillator with the other of the feedback and reference signals, and
(f) means for connecting said combining means to the other input of the phase comparator, and
(g) means for connecting the input of the voltage controlled oscillator to the output of the speed difference detector network,
(h) whereby the magnitude of said speed control signal is substantially independent of the phase angle between the feedback and reference signals.

14. A speed difference detector network as set forth in claim 13 in which the combining means comprises means for digitally adding the signals applied thereto.

15. A speed difference detector network as set forth in claim 13 or 14 in which the phase comparator and voltage controlled oscillator are included in a phase locked loop integrated circuit.

16. In a motor speed control system having a first signal generating device for producing a digital feedback signal having a frequency indicative of the actual speed of the motor, and a second signal generating device for producing a digital reference signal having a frequency indicative of the desired speed of the motor, the improvement comprising:
(a) a phase comparator having first and second inputs and an output,
(b) a voltage controlled oscillator having an input and an output,
(c) means including a low pass filter for connecting the output of the phase comparator to the input of the voltage controlled oscillator,
(d) means for connecting the first input of the phase comparator to only receive the reference signal,
(e) first digital signal combining means for combining the signal at the output of the voltage controlled oscillator with the feedback signal, said signal combining means having an output connected to the second input of the phase comparator,
(f) whereby the signal at the output of the low pass filter comprises a speed difference signal that varies in accordance with the difference between the actual and desired speed of the motor and is substantialy independent of the phase angle between the feedback and reference signals.

17. In a motor speed control system having a first signal generating device for producing a digital feedback signal having a frequency indicative of the actual speed of the motor, and a second signal generating device for producing a digital reference signal having a frequency indicative of the desired speed of the motor, the improvement comprising:
(a) a phase comparator having first and second inputs and an output,
(b) a voltage controlled oscillator having an input and an output,
(c) means including a low pass filter for connecting the output of the phase comparator to the input of the voltage controlled oscillator,
(d) means for connecting the first input of the phase comparator to only receive the feedback signal,
(e) first digital signal combining means for combining the signal at the output of the voltage controlled oscillator with the reference signal, said signal combining means having an output connected to the second input of the phase comparator,
(f) whereby the signal at the output of the low pass filter comprises a speed difference signal that varies in accordance with the difference between the actual and desired speed of the motor and is substantially independent of the phase angle between the feedback and reference signals.

18. In a motor speed control system having a first signal generating device for producing a digital feedback signal having a frequency indicative of the actual speed of the motor, and a second signal generating device for producing a digital reference signal having a frequency indicative of the desired speed of the motor, the improvement comprising:
(a) a phase comparator having first and second inputs and an output,
(b) a voltage controlled oscillator having an input and an output,
(c) a low pass filter,
(d) means for connecting the first input of the phase comparator to receive one of the feedback and reference signals,
(e) first digital signal combining means for combining the signal at the output of the voltage controlled oscillator with the other of the feedback and reference signals, said signal combining means having an output connected to the second input of the phase comparator,
(f) means for connecting the phase comparator, the low pass filter and the motor in a first closed circuit path, and
(g) means for connecting the phase comparator, the low pass filter, the voltage controlled oscillator and the signal combining means in a second closed circuit path.

* * * * *